March 28, 1950     T. K. COX     2,501,863
METHOD OF AND APPARATUS FOR MOLDING ARTICLES
Filed Sept. 27, 1945     3 Sheets-Sheet 1

INVENTOR
T. K. COX
ATTORNEY

March 28, 1950     T. K. COX     2,501,863
METHOD OF AND APPARATUS FOR MOLDING ARTICLES
Filed Sept. 27, 1945     3 Sheets-Sheet 2
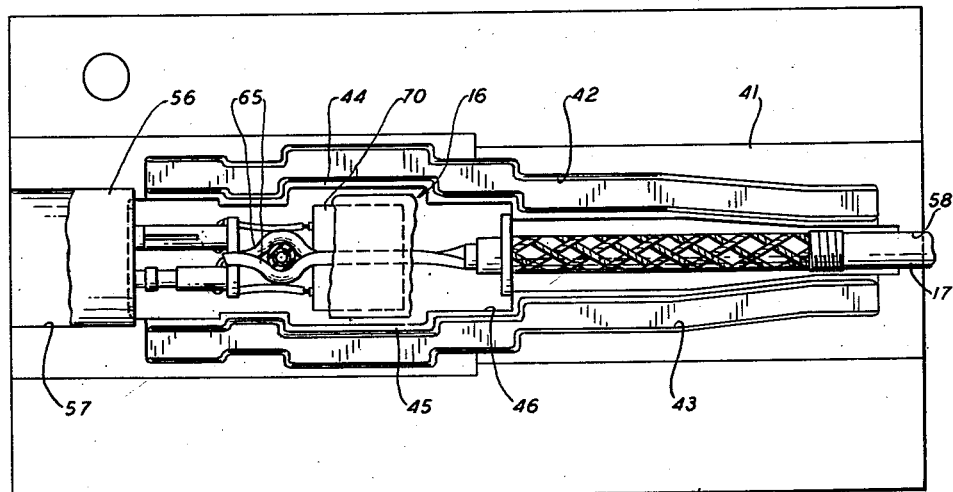
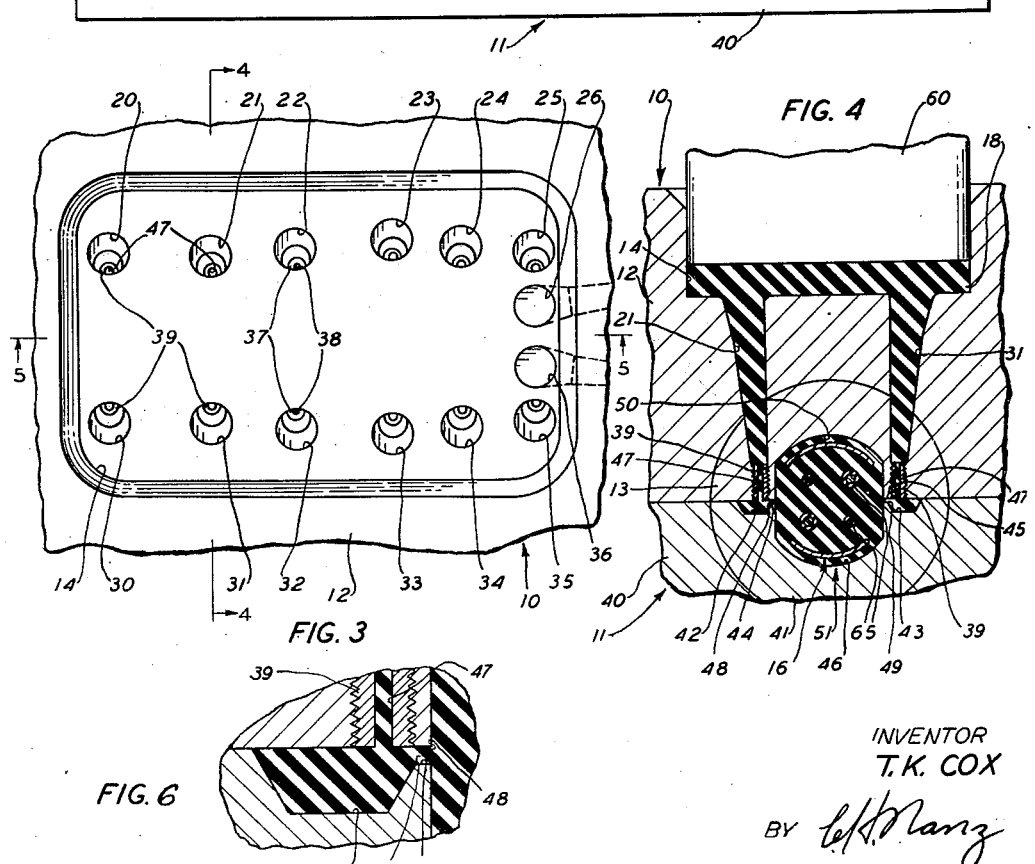
INVENTOR
T. K. COX
BY *[signature]*
ATTORNEY March 28, 1950 T. K. COX 2,501,863
METHOD OF AND APPARATUS FOR MOLDING ARTICLES
Filed Sept. 27, 1945 3 Sheets-Sheet 3

INVENTOR
T. K. COX
BY
ATTORNEY

Patented Mar. 28, 1950

2,501,863

UNITED STATES PATENT OFFICE 2,501,863

METHOD OF AND APPARATUS FOR MOLDING ARTICLES

Thomas K. Cox, Randallstown, Md., assignor to Western Electric Company, Incorporated, New York, N. Y., a corporation of New York Application September 27, 1945, Serial No. 618,962

15 Claims. (Cl. 18—36)

This invention relates to methods of and apparatus for molding articles.

In molding a plastic material, such as a hot rubber compound, around a flexible insert positioned in a molding cavity of a mold, sometimes the material is extruded into the molding cavity, is cooled, and the molded article is removed from the cavity prior to the vulcanization thereof. Such operations are designated pre-vulcanization molding. Previously known molds extrude the molding material into the cavity from orifices spaced widely apart along the mold cavity, whereby differential pressures are formed in the molded material. The differential pressures cause the periphery of the molded article to be lumpy when the article is removed from the mold.

An object of the invention is the provision of new and improved methods of and apparatus for molding articles.

A further object of the invention is to provide new and improved methods of and apparatus for molding material around a skeleton terminal of a cable so as to eliminate all lumps in the periphery of the molded material.

In accordance with these and other objects, one method of molding articles embodying the invention includes the step of extruding molding material in a thin sheet into a mold cavity.

An apparatus forming one embodiment of the invention includes a mold having a molding cavity formed therein, an extrusion chamber and a passage extending from the extrusion chamber to the mold cavity, the discharge end of said passage being substantially line-like in cross-section.

In practicing the invention in accordance with one embodiment of the invention, a skeleton cable terminal on the end of a cable is placed in an elongated molding cavity formed in a pair of separable mold sections. One of the mold sections has an extrusion chamber therein which is connected by sprues to distributing channels formed in the other mold section. The channels extend along substantially the entire length of the molding cavity on opposite sides thereof and are connected to the cavity by thin, line-like orifices, which extend substantially the entire length of the cavity. Heated molding material is forced through the sprues into the channels and into the molding cavity through the thin orifices, which further plasticize the material.

A complete understanding of the invention may be obtained from the following detailed description of methods and apparatus forming specific embodiments thereof, when read in conjunction with the appended drawings, in which:

Fig. 2 is a top plan view of a portion of the apparatus;

Fig. 3 is a fragmentary, top plan view of the apparatus;

Fig. 4 is a fragmentary, vertical section taken along line 4—4 of Fig. 3;

Fig. 6 is an enlarged fragmentary, vertical section of a portion of the apparatus shown in Fig. 5;

Figure 1:
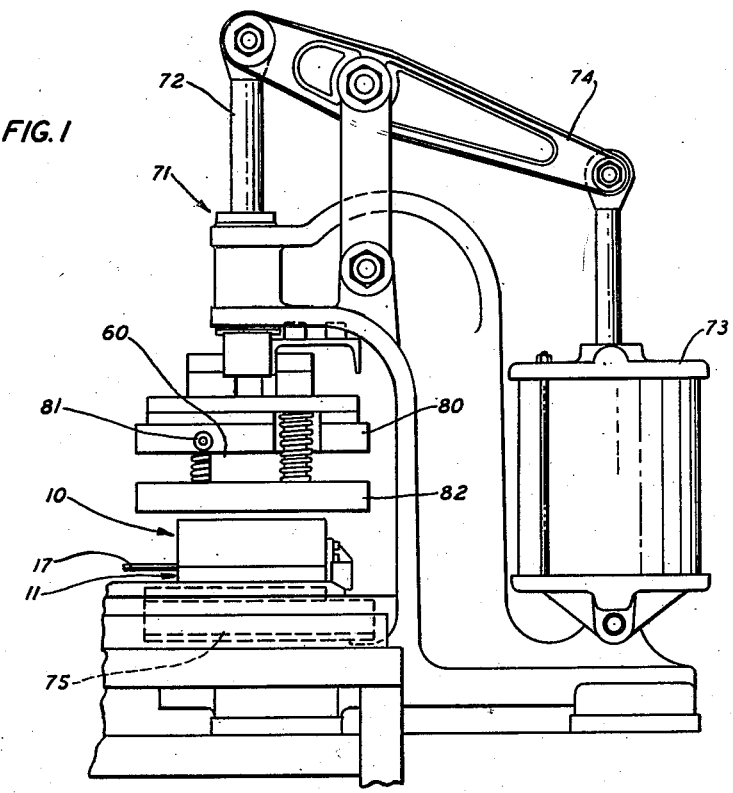
Fig. 1 is a side elevation of an apparatus forming one embodiment of the invention.
Figure 5:
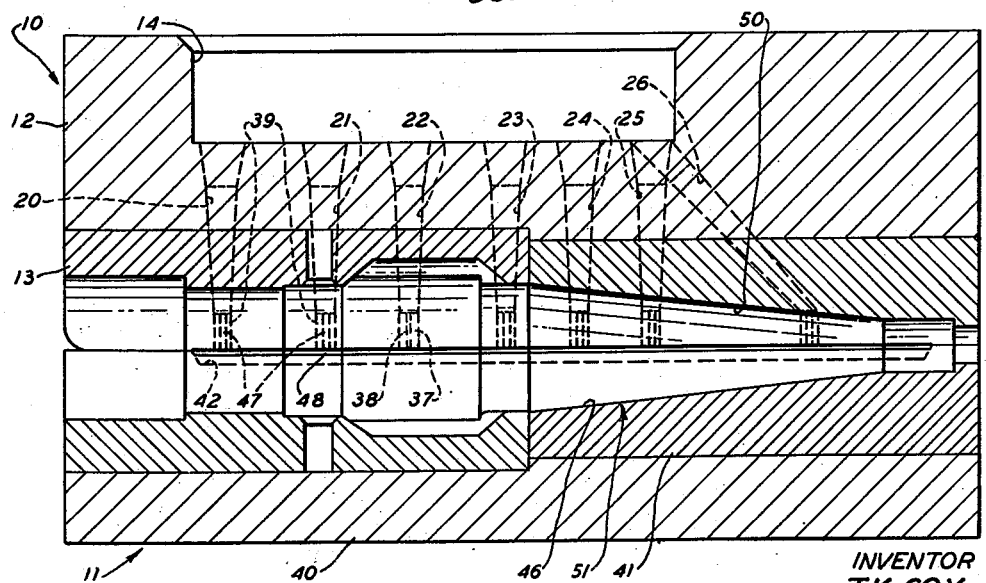
Fig. 5 is a vertical section taken along line 5—5 of Fig. 3.

Referring now in detail to the drawings, Figs. 1 to 6, inclusive, illustrate a molding apparatus embodying the invention which is designed to mold insulating material around a skeleton cable terminal. This apparatus comprises an upper mold section 10 (Fig. 3) and a lower mold section 11 forming portions of a mold which is designed to extrude a mass of thermosetting molding material 18, such as a rubber or a rubber-like insulating compound around a skeleton terminal 16 positioned on the end of a cable 17 (Fig. 2). The upper mold section includes an upper mold block 12, an upper mold insert 13, which is formed of two sections for convenience of construction, and an extrusion chamber 14 formed in the upper mold block. Sprues 20, 21, 22, 23, 24, 25, 26, 30, 31, 32, 33, 34, 35 and 36 (Fig. 3) lead from opposite sides of the bottom of the extrusion chamber to the bottom of the upper mold section. Tubular nozzles 37—37 threaded into the outlet ends of the sprues 22 and 32 are provided with small passages 38—38 extending therethrough, and tubular nozzles 39—39 threaded into the outlet ends of the other sprues are provided with passages 47—47 which are larger than the passages 38—38.

The lower mold section 11 (Fig. 4) includes a lower mold block 40 and a lower mold insert 41, which is formed in two sections to facilitate constructing it. Elongated distributing channels 42 and 43 are formed in the lower mold insert and are separated by elongated lands 44 and 45, respectively, from a lower molding recess 46 formed in the lower mold insert. An upper molding recess 50 formed in the upper mold insert 13 is complementary to the lower mold recess and forms therewith a molding cavity 51. The channels 42 and 43 are positioned directly below the outlets of the sprues 20 to 26, inclusive, and 30 to 36, inclusive, respectively, when the mold sections 10 and 11 are closed, as shown in Fig. 3, and the elongated lands 44 and 45 are spaced a short distance from the bottom of the upper mold insert 13 to form therewith line-like extrusion passages 48 and 49, respectively. The depth of the passages 48 and 49 is very small and preferably should be from about 0.003" to about 0.015" for best results in molding terminals.

A mold cap 56 positioned in a socket 57 serves to interlock with the end of the skeleton terminal 16, and the cable 17 fits closely in grooves formed in the mold sections 10 and 11, of which grooves a groove 58 is shown. The mold cap and the close-fitting grooves serve to center the skeleton terminal 16 in the molding cavity 51 (Fig. 3) during the molding operation. A plunger 60 fits into the extrusion chamber 14 and is designed to force the material 18 through the sprues 20 to 26, inclusive, and 30 to 36, inclusive, the small passages 38—38 in the tubular nozzles 37—37, the channels 42 and 43 and the line-like extrusion passages 48 and 49 formed by the lands 44 and 45 and the bottom portions of the upper mold insert 13 positioned directly above the lands.

The mold sections 10 and 11 are used in conjunction with a molding press 71 (Fig. 1) provided with a ram 72, which is attached to the plunger 60 and is actuated by hydraulic motive means 73 through a lever 74. A lower platen 75 supports the mold sections 10 and 11 and an upper platen 80, which is heated by means of a steam pipe 81, heats the plunger 60 and the mold sections through a stripper plate 82, which is designed to hold the mold sections together. The lower platen also is heated by a steam pipe (not shown) and aids in heating the mold sections.

In the operation of the apparatus described hereinabove to perform one method embodying the invention, with the mold sections 10 and 11, in the molding press 71, the skeleton terminal 16 is placed in interlocking engagement with the mold cap 56, the mold cap is placed in the socket 57, the skeleton terminal is placed in the molding recess 46 in the lower mold section 11, and the cable 17 is placed in the groove 58. The mold sections 10 and 11 then are closed, and the extrusion chamber 14 is charged with the molding material 18. The hydraulic mechanism 73 (Fig. 1) then is actuated to move the plunger 60, the upper platen 80 and the stripper plate 82 downwardly, as viewed in Fig. 1, and the plunger 60 forces the molding material through the sprues 20 to 26, inclusive, and 30 to 36, inclusive, into the channels 42 and 43, respectively. The heat of the mold sections, which are heated by the platen 80 and the pressure on the material, plasticizes it sufficiently to facilitate the flow thereof.

The material then is forced in thin sheets through the line-like extrusion passages 48 and 49. These extrusion passages extend substantially the entire length of the mold cavity 51 so that the flow of the material around the skeleton terminal is almost entirely transverse thereto. Also, the extrusion passage 48 is directed opposite to the extrusion passage 49 so that the flow of the material from the two passages is balanced. This balanced flow of the material, which is directed substantially toward the centerline of the mold cavity 51, prevents bunching of conductors 65—65 of the skeleton terminal, and maintains the conductors and other elements of the skeleton terminal in properly oriented positions.

A loading coil 70 of the skeleton terminal 16 occupies a relatively greater part of the portion of the molding cavity 51 in which it is positioned than do the other elements of the skeleton terminal in the portions of the molding cavity which they occupy. However, the small passages 38—38 of the tubular nozzles 37—37, which are positioned in the sprues nearest to the loading coil, permit less molding material 18 to flow therethrough than flows through the passages 47—47 of the nozzles 39—39 positioned in the other sprues so that little, if any, flow of the material occurs lengthwise of the molding cavity. The material 18 is extruded completely over the elements of the skeleton terminal 16 and fills all void spaces in the molding cavity 51.

After the molding cavity has been filled, the plunger 60 is moved out of the extrusion chamber 14, and the mold sections 10 and 11 are opened. The skeleton terminal with the molded material extruded thereover and the mold cap 56 are removed from the mold, and the skeleton terminal and the mold cap then are disengaged. The above-described operation may then be repeated with skeleton terminals (not shown) identical with the skeleton terminal 16.

The material 18 molded around the skeleton terminal 16 then is covered with strips of jacketing compound (not shown), such as a rubber or a rubber-like compound, which strips may be easily positioned around the periphery of the molded material without air voids therebetween because no lumps of the material 18 project from the periphery. Such lumps are present where prevulcanization molding is accomplished by mold sections having large orifices opening into an elongated molding cavity at widely separated points along the molding cavity, which cause separated high pressure areas in the molded material. Such lumps cause voids and also cause the jacketing compound molded thereover to be too thin.

In the pre-vulcanization molding described hereinabove, the material is extruded along an elongated and thin line through the extrusion passages 48 and 49 from the channels 42 and 43, in which channels the pressure of the material is equalized, so that no high pressure areas occur at separated points along the length of the molding cavity. Hence, no lumps are formed in the extruded product, and the strips of jacketing compound may be molded therearound easily in a manner such as to prevent voids therebetween. The thinness of the extrusion passages 48 and 49 also contributes to the avoidance of lumps because the material becomes more plastic as it is forced therethrough and the extrusion passages resist the flow of the material therethrough sufficiently to equalize the pressure of the material in the channels 42 and 43 which are less resistant to the flow of the material than the extrusion passages.

The mold described hereinabove obviously may be used to vulcanize the molding material 18 if it is deemed necessary, and may be used to mold thermoplastic materials or any thermosetting material.

Figure 8:
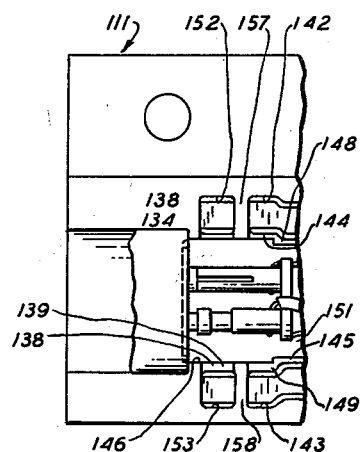
Fig. 8 is a fragmentary, top plan view of a portion of the apparatus shown in Fig. 7.
Figure 7:
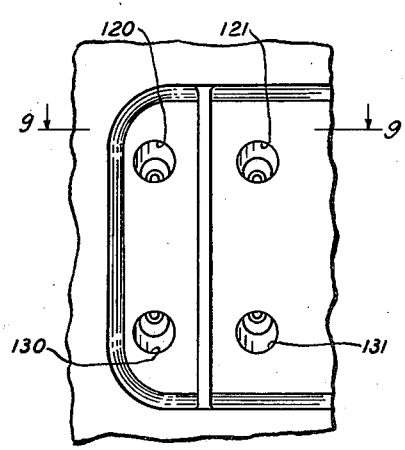
Fig. 7 is a fragmentary, top plan view of an apparatus forming an alternative embodiment of the invention.

An alternative embodiment of the invention is shown in Figs. 6, 7 and 8. This embodiment comprises mold sections 110 and 111 identical with the mold sections 10 and 11, except that the mold section 111 has a pair of short distributing channels 152 and 153 separated completely from elongated distributing passages 142 and 143 by thin walls 157 and 158, and that the mold section 110 has a short extrusion chamber 117 directly over the distributing channels 152 and 153 an elongated extrusion chamber 114 separated therefrom by a wall 119.

A plunger 160 has a slot 161 formed therein to provide clearance for the wall 119, which slot divides the plunger 160 into a short portion 166 and a long portion 167. The short portion 166 of the plunger 160 is designed to extrude molding material 137 of one type from the extrusion chamber 117 through sprues 120 and 130 into the distributing channels 152 and 153, respectively. The molding material flows from the channels 152 and 153 through line-like extrusion passages 138 and 139 formed by lands 134 and 135 and the mold section 110 into the left end of a molding cavity 151 formed by a molding recess 146 and a complementary molding recess (not shown) formed in the mold section 110.

Molding material 118 of a second type is extruded by the long portion 167 of the plunger 160 from the extrusion chamber 114 into the molding cavity 151 through sprues 121—121 and 131—131, line-like extrusion passages 148 and 149 formed by lands 143 and 144 and the portions of the mold section adjacent thereto. Thus, in a single molding operation, molding material of one type may be extruded over the left end of a skeleton terminal 116, as viewed in Fig. 7, and molding material of a second type may be extruded over the remainder of the skeleton terminal.

In the operation of the last-described mold, the mold sections 110 and 111 are placed in a press (not shown) similar to the press 71 (Fig. 1) and the plunger 160 is installed in the press. The remainder of the molding operation is identical with that of the mold sections 10 and 11 except that the two molding materials 118 and 137 are extruded simultaneously into distinct portions of the molding cavity 151 from the extrusion chambers 114 and 117, respectively. The thin walls 157 and 158 permit the molding materials 118 and 137 to meet along a plane extending therebetween with very little flow of the materials lengthwise of the molding cavity 151.

The last-described mold serves to mold the materials 118 and 137 around the skeleton terminal 116 simultaneously in a single molding operation with a consequent saving in time and apparatus over those required to mold the different types of molding material separately. Also, no lumps are formed on the materials molded.

Figure 9:
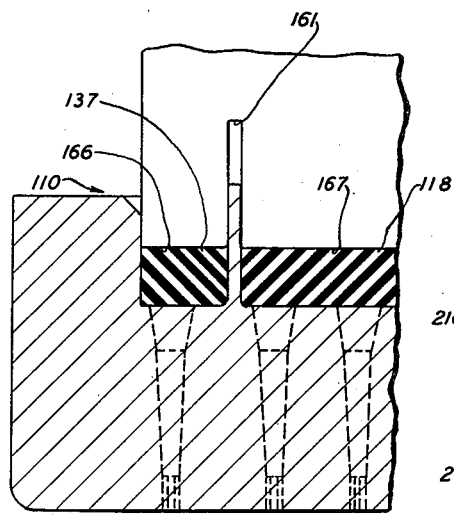
Fig. 9 is a fragmentary, vertical section taken along line 9—9 of Fig. 7.
Figure 10:
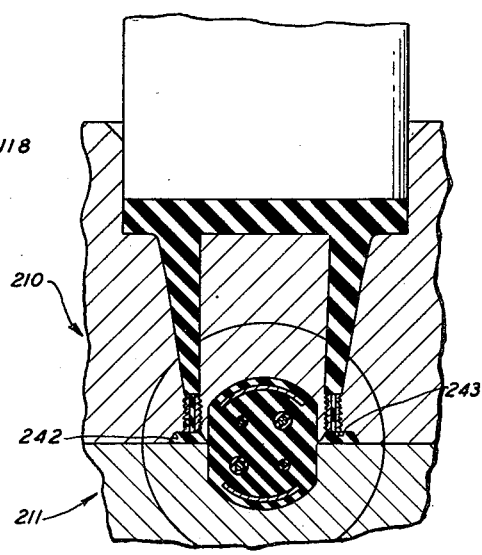
Fig. 10 is a fragmentary, vertical section of an apparatus forming a further embodiment of the invention.

A mold comprising a third embodiment of the invention is shown in Fig. 9 and includes mold sections 210 and 211. The mold sections 210 and 211 are identical with the mold sections 10 and 11 except that elongated distributing channels 242 and 243, which correspond to the distributing channels 42 and 43, are formed in the upper mold section 210 instead of the lower mold section 211.

Obviously, the molds described hereinabove may be used to mold economically and efficiently out of thermosetting or thermoplastic materials a wide variety of objects as well as cable terminals.

What is claimed is:

1. The method of molding articles, which comprises positioning a flexible core in a mold cavity, forcing plastic molding material in a predetermined direction into the molding cavity against one side of the flexible core in the form of a thin sheet extending substantially the entire length of the cavity, and simultaneously with said forcing step forcing plastic molding material in a direction opposite to that of the first-mentioned sheet against the opposite side of the core in the form of a thin sheet extending substantially the entire length of the cavity.

2. The method of molding vulcanizable articles prior to the vulcanization thereof, which comprises forcing plastic molding material into one side of an elongated molding cavity having a core positioned therein in the form of a thin sheet extending substantially the entire length of the molding cavity, and simultaneously with said forcing step forcing plastic molding material into the molding cavity from a side diametrically opposed to the first-mentioned side in the form of a thin sheet extending substantially the entire length of the molding cavity, said sheets of the molding material being not less than three-thousandths of an inch thick.

3. A molding apparatus, which comprises a mold having formed therein a molding cavity, a deep channel extending along one edge of the molding cavity, a wide shallow passage extending from the molding cavity to the channel, an extrusion chamber and a plurality of sprues spaced along the mold for connecting the channel to the extrusion chamber, said channel serving to substantially equalize along the length thereof the pressure of molding material forced through the sprues into the channel so that the pressure of the material being forced through the passage is equal along the width of the passage, and means for applying a high pressure to the material in the extrusion chamber.

4. A molding apparatus, which comprises a mold having formed therein a molding cavity, a wide thin passage opening into the molding cavity, an extrusion chamber, a plurality of spaced sprues leading from the extrusion chamber and a large distributing channel for connecting the sprues with the wide thin passage so that the pressure of molding material forced through the sprues, the distributing channel and the wide thin passage is equalized in the distributing channel, and means for forcing the material under a high pressure from the extrusion chamber.

5. A molding apparatus, which comprises a mold having formed therein an extrusion chamber, a sprue in communication with and leading from the extrusion chamber, a large elongated distributing passage in communication with the sprue and extending laterally thereof, a wide, thin extrusion passage extending along and in communication with the distributing passage and an elongated molding cavity extending along and in communication with the extrusion passage, and means for forcing molding material from the extrusion chamber through the sprue, the distributing passage and the wide, thin extrusion passage, whereby the molding material is forced into the molding cavity in the form of a wide, thin sheet.

6. A molding apparatus, which comprises a mold having formed therein an extrusion chamber, an elongated distributing channel of a large cross-sectional size, a plurality of sprues connecting the distributing channel with the extrusion chamber at points spaced along the channel, an elongated molding cavity paralleling the distributing channel and a wide, thin extrusion passage connecting the distributing channel with the molding cavity, and means for forcing molding material from the extrusion chamber into the molding cavity through the sprues, the channel and the extrusion passage.

7. A molding apparatus, which comprises a mold having formed therein an elongated molding cavity, an extrusion chamber, a pair of shallow extrusion passages extending along opposite sides of the molding cavity for substantially its entire length and communicating with the molding cavity, a pair of deep distributing channels paralleling and in communication with the shallow extrusion passages and a plurality of sprues connecting the extrusion chamber with the distributing channels at spaced points along the channels.

8. A mold, which comprises a mold section having formed therein an extrusion chamber, a molding recess and a plurality of sprues leading from the extrusion chamber to points on the junction line of the mold section spaced along opposite sides of the molding recess, and a second mold section having formed therein a molding recess complementary to the molding recess in the first mold section and a pair of distributing channels positioned on opposite sides of the molding recesses and extending parallel with the molding recesses, said channels opening into the sprues, said mold sections forming a plurality of wide, thin extrusion passages connecting the molding recesses with the distributing channels.

9. A mold, which comprises an upper mold section and a lower mold section designed to fit against the upper mold section, said mold sections having a pair of elongated complementary molding recesses forming an elongated molding cavity for receiving a skeleton terminal, said upper mold section being provided with an extrusion chamber positioned over the molding cavity, a group of sprues leading from the extrusion chamber to points on the junction line of mold sections spaced along one side of the molding cavity and a second group of sprues leading from the extrusion chamber to points on the junction line of the mold sections spaced on the other side of the molding cavity, said lower mold section being provided with a pair of deep channels positioned directly below the outlets of the two groups of sprues and extending along the molding cavity on opposite sides thereof substantially the entire length of the cavity said mold sections forming a pair of oppositely directed, shallow extrusion passages connecting the channels with the molding cavity, each of said extrusion passages having a width at the outlet thereof substantially equal to the length of the molding cavity.

10. The method of molding articles, which comprises extruding against opposite sides of one portion of a flexible insert plastic material of one type into one portion of a molding cavity in the form of thin sheets lying in a predetermined plane and extending along said portion of the molding cavity, and extruding against opposite sides of another portion of the insert plastic material of a second type into a portion of the molding cavity immediately adjacent to the first-mentioned portion thereof in the form of thin sheets lying in said plane.

11. The method of molding distinct types of plastic molding material over a skeleton cable terminal, which comprises positioning a skeleton cable terminal in an elongated molding cavity, extruding molding material of one type into the molding cavity in the form of oppositely directed thin sheets extending along opposed portions of the molding cavity, and extruding molding material of a second type into the molding cavity in the form of oppositely directed thin sheets lying in the same planes as the sheets of the first-mentioned molding material.

12. A molding apparatus, which comprises a mold having formed therein a molding cavity, a pair of extrusion chambers, a pair of distributing channels extending along opposite sides of the molding cavity, a pair of partitions dividing each of the distributing channels into two portions, a sprue leading from one of the extrusion chambers to one of the distributing channels on one side of the partition, a second sprue leading from the other extrusion chamber to the last-mentioned distributing channel on the other side of the partition therein, a third sprue leading from one of the extrusion chambers to the other distributing channel on one side of the partition therein, a fourth sprue leading from the other extrusion chamber to the last-mentioned distributing channel on the opposite side of the partition therein, and thin sheet-like passages leading from the distributing channels to the molding cavity.

13. A molding apparatus, which comprises a pair of mold sections having formed therein an elongated molding cavity, a pair of elongated distributing channels extending along opposite sides of the molding cavity, an extrusion chamber, a plurality of sprues leading from the extrusion chamber to the distributing channels, a plurality of thin sheet-like extrusion passages connecting the elongated channels with the molding cavity, a pair of short distributing channels extending along opposite sides of the molding cavity and positioned substantially in alignment with the elongated distributing channels, a second extrusion chamber, a plurality of sprues connecting the second extrusion chamber to the short distributing channels and a plurality of thin sheet-like passages connecting the short distributing channels with the molding cavity.

14. A molding apparatus, which comprises a mold section having a molding recess formed therein, and a second mold section having formed therein a molding recess complementary to the molding recess in the first mold section for forming a molding cavity therewith when the mold sections are joined together, an extrusion chamber, a distributing channel extending along the molding recess in the second mold section and being open at the junction line of the second mold section and a plurality of sprues connecting the extrusion chamber with the distributing channel at spaced points therealong, said mold sections having a passage connecting the distributing channel with the molding cavity, said passage having an outlet substantially line-like in cross-section.

15. A molding apparatus, which comprises a mold section having an elongated molding recess formed therein, and a second mold section having a junction face for fitting against the first-mentioned mold section, said second mold section also being provided with an elongated molding recess complementary to the molding recess in the first mold section for forming a molding cavity therewith when the mold sections are positioned together, an extrusion chamber, a pair of elongated distributing channels open at the junction face of the second mold section, and a plurality of sprues leading from the extrusion chamber to the distributing channels at points spaced along the distributing channels, said mold sections being provided with a plurality of thin extrusion passages leading from the distributing channels to the molding cavity and extending substantially the entire length of the molding cavity, said extrusion passages having outlets of substantially line-like cross-sections.

THOMAS K. COX.

REFERENCES CITED

The following references are of record in the file of this patent:

UNITED STATES PATENTS

| Number | Name | Date |
|---|---|---|
| 912,092 | Droitcour | Feb. 9, 1909 |
| 1,518,190 | Emery | Dec. 9, 1924 |
| 2,019,064 | Apple | Oct. 29, 1935 |
| 2,043,584 | Husted | June 9, 1936 |
| 2,186,160 | Anderson | Jan. 9, 1940 |
| 2,337,550 | Crosby | Dec. 28, 1943 |
| 2,347,773 | Franz | May 2, 1944 |
| 2,369,291 | Frank et al. | Feb. 13, 1945 |

FOREIGN PATENTS

| Number | Country | Date |
|---|---|---|
| 541,050 | Germany | July 8, 1939 |
| 659,098 | Germany | Apr. 25, 1938 |